United States Patent [19]
Suzuki

[11] Patent Number: 5,500,521
[45] Date of Patent: Mar. 19, 1996

[54] OPTICAL SENSOR ARRANGEMENT FOR TRACKING A STAR, WITH DARK CURRENT PIXEL BY PIXEL SENSOR COMPENSATION

[75] Inventor: Naoshi Suzuki, Tokyo, Japan

[73] Assignee: NEC Corporation, Japan

[21] Appl. No.: 164,026

[22] Filed: Dec. 8, 1993

[30] Foreign Application Priority Data

Dec. 8, 1992 [JP] Japan .................. 4-328210

[51] Int. Cl.⁶ .................................. H01L 27/00
[52] U.S. Cl. .......................... 250/208.1; 250/203.1
[58] Field of Search ............... 250/208.1, 203.1–203.3; 358/213.16, 213.15; 377/58

[56] References Cited

U.S. PATENT DOCUMENTS

| | | | |
|---|---|---|---|
| 4,412,343 | 10/1983 | Kosonocky . | |
| 4,633,075 | 12/1986 | Sakai et al. ................ | 250/208.1 |
| 4,893,185 | 1/1990 | Fukushima et al. . | |
| 5,027,199 | 6/1991 | Suzuki ........................ | 377/58 |
| 5,216,511 | 6/1993 | Tani . | |

FOREIGN PATENT DOCUMENTS 60-226398  11/1985  Japan .

OTHER PUBLICATIONS

*Patent Abstracts of Japan*, JP–A–60 165 563, Aug. 28, 1985, vol. 10, No. 9 (P–420) (2066) Jan. 14, 1986.

*Primary Examiner*—Stephone B. Allen
*Attorney, Agent, or Firm*—Ostrolenk, Faber, Gerb & Soffen

[57] ABSTRACT

In an optical sensor arrangement which is for use on a spacecraft in tracking an objective star and comprises an optical sensor comprising pixels for receiving starlight from the star to produce pixel output signals with or without dark currents, such dark currents are compensated for by a device which comprises (A) a projecting unit for projecting a real image of at least one star on a certain number of pixels, nine pixels in the illustrated simple example, to make the optical sensor produce sensor output signals a few times, such as five times, and (B) a processor unit for processing the processor output signals into compensating data for use in compensating for the dark currents. Preferably, the processor unit comprises a pixel address generator, a data memory, and a digital processor.

4 Claims, 4 Drawing Sheets

|   |   |   |
|---|---|---|
| 0 | 0 | 0 |
| 5 | 3 | 0 |
| 0 | 0 | 0 |

(A) n=1

|   |   |   |
|---|---|---|
| 0 | 0 | 0 |
| 0 | 3 | 0 |
| 0 | 10 | 0 |

(B) n=2

|   |   |   |
|---|---|---|
| 0 | 20 | 0 |
| 0 | 3 | 0 |
| 0 | 0 | 0 |

(C) n=3

|   |   |   |
|---|---|---|
| 0 | 0 | 6 |
| 0 | 3 | 0 |
| 0 | 5 | 0 |

(D) n=4

|   |   |   |
|---|---|---|
| 0 | 0 | 0 |
| 0 | 3 | 0 |
| 0 | 0 | 0 |

(E) n=5

|   |   |   |
|---|---|---|
| 0 | 0 | 0 |
| 0 | 3 | 0 |
| 0 | 0 | 0 |

OPTICAL SENSOR ARRANGEMENT FOR TRACKING A STAR, WITH DARK CURRENT PIXEL BY PIXEL SENSOR COMPENSATION

BACKGROUND OF THE INVENTION

This invention relates to an optical sensor arrangement for tracking a star and, more particularly, to a device for compensating for dark currents of optical sensor elements used in the optical sensor arrangement as an optical sensor which is typically a charge coupled device (CCD) comprising such optical sensor elements in a two-dimensional array. The star is preferably a fixed star.

Such an optical sensor arrangement is used in a spacecraft which may be an artificial satellite. For use typically in a spacecraft, an image pickup system is disclosed in U.S. Pat. No. 5,027,199 which was issued to the present inventor and assigned to the instant assignee. The image pickup system is for dealing with a terrestrial objective zone and is appreciably different in this respect from the optical sensor arrangement under consideration. This patent will, however, be herein incorporated by reference.

An excellent star tracker is revealed in Japanese Patent Prepublication (A) No. 226,398 of 1985 for a patent application filed in Japan in relation to a prior invention of YOKOTA-Toyohati (transliteration according to ISO 3602) by NEC Corporation, the present assignee. In the manner which will later be described in greater detail, the star tracker comprises a shutter in an optical path from an objective star to a charge coupled device of the star tracker. A shutter driver is controlled by a driver control circuit to drive the shutter in first through third modes of operation. As described heretobefore, the charge coupled device is used as an optical sensor and comprises two-dimensionally arranged optical sensor elements which may alternatively be called pixels.

In the first mode, the shutter is put away of the optical path. An optical system of the star tracker focusses the starlight as a real image of the objective star on a certain number of pixels, such as 1,000 by 1,000 pixels, of the charge coupled device. Responsive to the real image, the optical sensor produces a first sensor output signal. In the second mode, the optical path is interrupted by the shutter. The optical sensor produces a second sensor output signal which is equal to a sum of dark currents of the pixels. Responsive to the first and the second sensor output signals, a processing unit of the star tracker decides a dark current component of the above-mentioned small number of pixels. In the third mode, the shutter is again put aside. The optical sensor produces a third sensor output signal. Using the dark current component and the third sensor output signal, the processing unit exactly determines a true brightness of the objective star.

In this manner, the star tracker can compensate for dark currents of the optical sensor elements and for fluctuation in the dark currents among the optical sensor elements. Consequently, the star tracker is stably operable and can precisely determine an exact position of the objective star on the celestial sphere.

The star tracker must, however, comprise the shutter, the shutter driver, and the driver control circuit. As a consequence, the star tracker is bulky in size and heavy in weight. This is objectionable for use in a spacecraft. Moreover, the shutter is liable to misoperation. This gives an objectionable reliability to the star tracker.

SUMMARY OF THE INVENTION

It is therefore an object of the present invention to provide a device which is for compensating for dark currents of optical sensor elements used in an optical sensor arrangement in receiving starlight of an objective star and which is compact and light-weighted.

It is another object of this invention to provide a device which is of the type described and which is stably and reliably operable.

It is still another object of this invention to provide a device which is of the type described and which need not comprise a shutter.

It is yet another object of this invention to provide a device which is of the type described and which comprises neither a shutter driver nor a driver control circuit.

It is a further object of this invention to provide a device which is of the type described and which is convenient for use on a spacecraft which may be an artificial satellite.

Other objects of this invention will become clear as the description proceeds.

On describing the gist of this invention, it is possible to understand that a device is for compensating for dark currents of a plurality of optical sensor elements for receiving light of an objective star in an optical sensor of an optical sensor arrangement.

In accordance with this invention, the above-understood device is characterized by (A) projecting means for projecting a real image of at least one star on several elements of the optical sensor to make the optical sensor produce sensor output signals a few incidences of time and (B) a processor unit for processing the sensor output signals into compensating data for use in compensating for the dark currents.

BRIEF DESCRIPTION OF THE DRAWING

FIGS. 5 show pixels of an optical sensor which is used in the device mentioned in conjunction with FIG. 2.

DESCRIPTION OF THE PREFERRED EMBODIMENT

Figure 1:
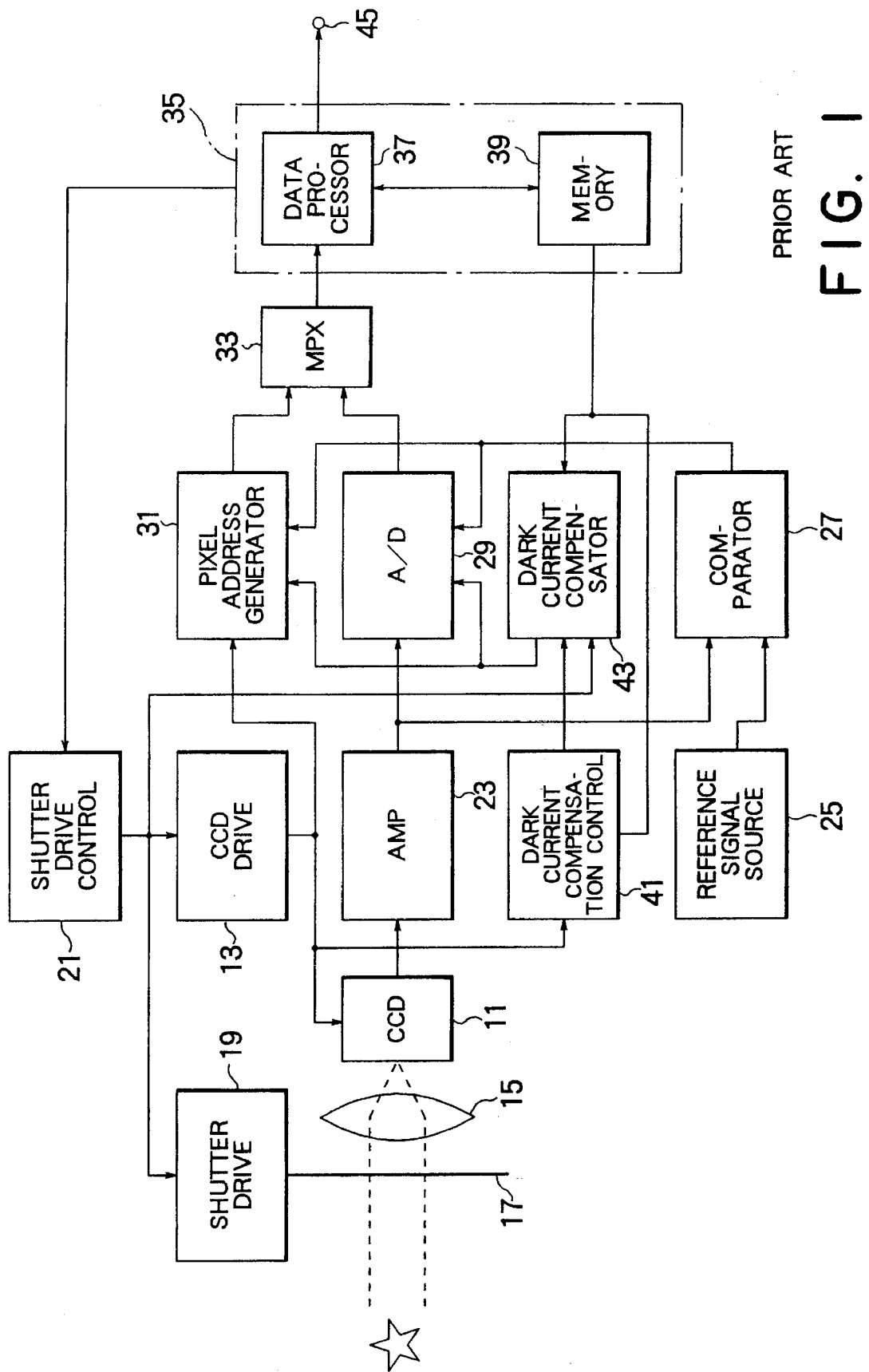
FIG. 1 shows in blocks a conventional optical sensor arrangement together with a schematically depicted objective star.

Referring to FIG. 1, a conventional optical sensor arrangement will first be described in order to facilitate an understanding of the present invention. This optical sensor arrangement is disclosed as a star tracker in Japanese Patent Prepublication (A) cited hereinabove and is for tracking on a spacecraft an objective star in a celestial map portion where bright celestial bodies (later depicted), such as the sun, the earth, and the moon, are absent. The objective star is symbolically illustrated.

The star tracker comprises a charge coupled device (CCD) 11 having a light receiving surface directed to the objective star by an attitude control mechanism which will later be discussed. In the manner known in the art, the charge coupled device 11 comprises a plurality of optical sensor elements or pixels which are two-dimensionally driven or scanned by a CCD drive signal produced by a CCD driver 13. An optical system 15 is symbolically exemplified by a single convex lens and receives light from the objective star as starlight. The optical system 15 focusses the starlight as a real image of the objective star on a certain number of pixels. It will be presumed merely by simplicity of the description that the real image is received by a single pixel.

The star tracker comprises a shutter 17 in an optical path (depicted by dashed lines) of the starlight in front of the optical system 15. The shutter 17 is driven by a shutter driver 19 to make the optical system 15 receive and not receive the starlight. In the manner which will presently be described, a shutter drive control circuit 21 controls the shutter driver 19 together with the CCD driver 13. Receiving the starlight, the charge coupled device 11 produces a sensor output signal. An amplifier (AMP) 23 amplifies the sensor output signal into an amplified signal.

A reference signal source 25 produces a reference signal representative of a threshold level which is decided by an apparent magnitude of the objective star and by an amplification factor of the amplifier 23. A comparator 27 produces an enable signal when the amplified signal has a signal level above the threshold level.

Enabled by the enable signal, an analog-to-digital converter (A/D) 29 converts the amplified signal into a digital signal. Enabled by the enable signal and connected to the CCD driver 13, a pixel address generator 31 produces a pixel address signal representative of pixel addresses in one-to-one correspondence to the digital signal. A multiplexer (MPX) 33 multiplexes the digital signal and the address signal into a multiplexed signal.

A control unit 35 comprises a data processor 37 and a dark current memory 39 which are operable in the manner which will become clear as the description proceeds. Generally speaking, the data processor 37 processes the multiplexed signal into a processed signal, which is stored in the dark current memory 39.

It may be mentioned here that the pixels of the charge coupled device 11 may have one or more "white" flaws. When a pixel has the white flaw, the pixel produces an individual dark current of a certain level even though the pixel is not illuminated but is kept dark. The charge coupled device 11 therefore produces a total dark current having individual dark current levels which depend on individual pixels. In order to compensate for the dark current and for fluctuations dependent on the individual pixels, the shutter drive control circuit 21 is operable in the first through the third modes of operation described heretobefore. In the first through the third modes, the charge coupled device 11 produces the first through the third sensor output signals mentioned hereinabove. Each of the first through the third sensor output signals comprises the individual dark current or currents of a certain number of pixels, such as 1,000 by 1,000 pixels.

A dark current compensation controller 41 and a dark current compensator 43 are connected to the dark current memory 39. In the first mode, the first sensor output signal and the pixel address signal are stored in the dark current memory 39.

In the second mode, the CCD driver 13 makes the dark current compensation controller 41 compare the CCD drive signal with the pixel address signal read from the dark current memory 39 to indicate a particular address of the pixel at which the real image of the objective star is focussed in the first mode. When the CCD drive signal and the pixel address signal of the dark current memory 39 are coincident and furthermore when the shutter drive control circuit 21 indicates the second mode, the dark current compensation controller 41 triggers the dark current compensator 43. Triggered, the dark current compensator 43 informs the analog-to-digital converter 29 and the pixel address generator 31 of the particular address. The analog-to-digital converter 29 converts the second sensor output signal of the particular address alone into a dark current component. Together with the address signal indicative of the particular address, the dark current component is stored in the dark current memory 39 through the analog-to-digital converter 29, the multiplexer 33, and the data processor 37.

In the third mode, the dark current compensator 43 reads the dark current component and the particular address which are stored in the dark current memory 39 in the second mode and delivers them to the analog-to-digital converter 29 and to the pixel address generator 31.

The data processor 37 now supplies an attitude control signal output terminal 45 with an attitude control output signal in which the individual dark currents and their fluctuations are compensated for and which is used in the attitude control mechanism. In the meanwhile, the control unit 35 delivers a mode control output signal to the shutter drive control circuit 21 to make the control circuit 21 indicate the first through the third modes of operation.

Figure 2:
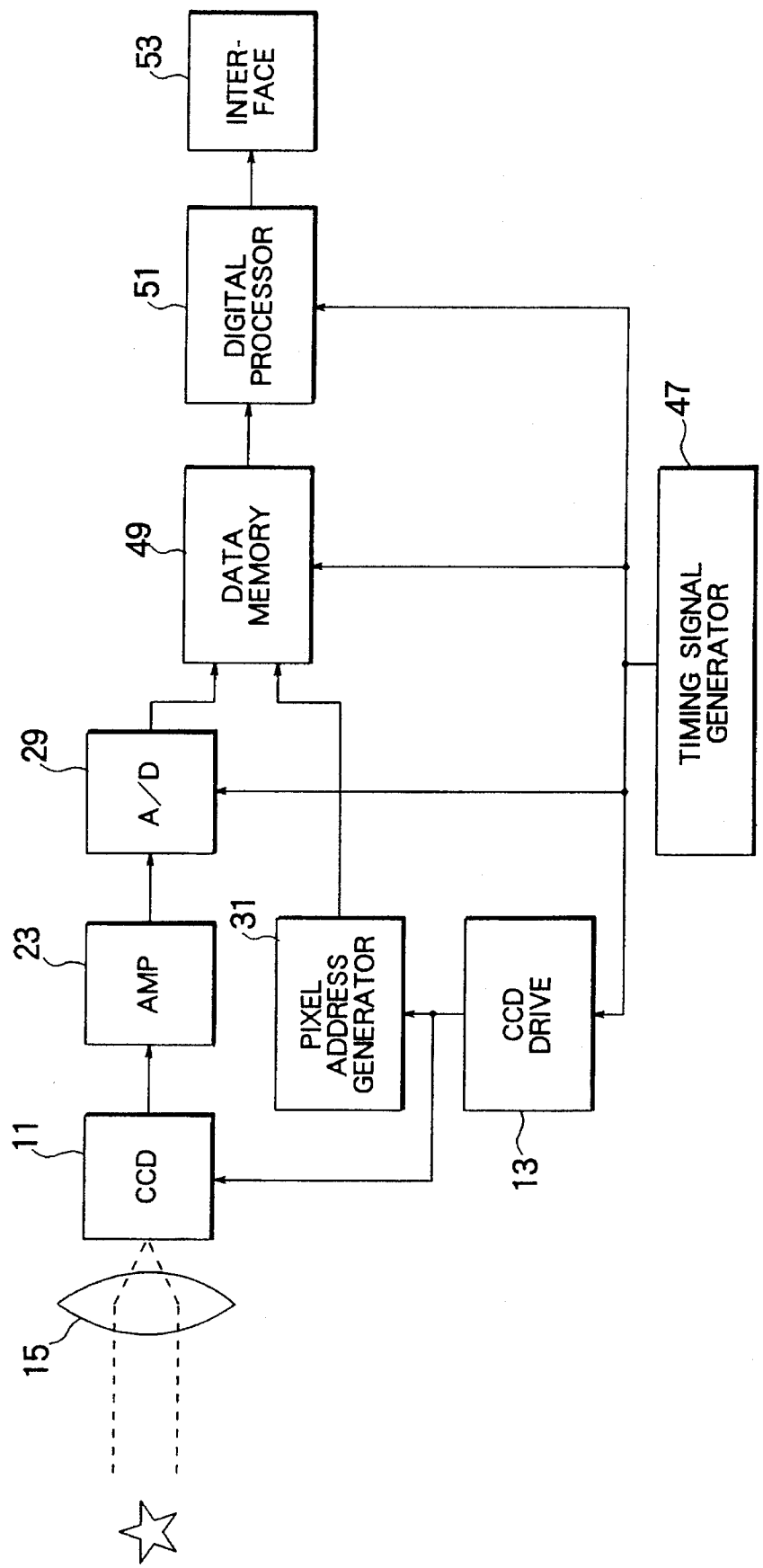
FIG. 2 shows in blocks, together with a symbolically depicted objective star, an optical sensor arrangement which comprises a device according to an embodiment of the instant invention.

Referring now to FIG. 2, the description will proceed to an optical sensor arrangement comprising a device which is for compensating for individual dark currents of a plurality of optical sensor elements or pixels receiving light of an objective star (symbolically depicted) as starlight in an optical sensor of the optical sensor arrangement and which is according to a preferred embodiment of the instant invention. Similar parts are designated by like reference numerals and are basically similarly operable.

That is, the optical sensor arrangement comprises the optical sensor which is exemplified as a charge coupled device (CCD) 11. Comprising the optical sensor elements or pixels given pixel addresses in the manner which will presently be illustrated, the optical sensor 11 (the same reference numeral being used) is driven or scanned by a CCD drive signal produced by a CCD driver 13 in a manner which is a little different as will shortly be described. The optical sensor 11 produces a sensor output signal.

An optical system 15 is disposed in an optical path of starlight from the objective star to the optical sensor 11 to focus a real image of the objective star on a certain number of pixels. It will again be presumed merely for simplicity of the description that the real image is focussed substantially on a single pixel alone.

Unlike the optical sensor arrangement illustrated with reference to FIG. 1, the shutter, the shutter driver, and the shutter drive control circuit are not used in the optical sensor arrangement being illustrated. In other words, the optical sensor arrangement of FIG. 2 need not be operable in the first through the third modes of operation described heretobefore. Instead, this optical sensor arrangement is put in connection with at least one star first in a data accumulating mode of operation and subsequently in a star tracking mode of operation of tracking the objective star.

In FIG. 2, the optical sensor arrangement comprises an amplifier (AMP) 23 and may or may not comprise the reference signal source 25 and the comparator 27 described in conjunction with FIG. 1. If included, the reference signal source 25 may produce the reference signal representative of upper and lower threshold levels for the objective star. The upper and the lower threshold levels may be adjustable. Use of such a reference signal source and the comparator is convenient in selecting the objective star.

An analog-to-digital converter (A/D) 29 and a pixel address generator 31 are used. The analog-to-digital converter 29 is, however, controlled somewhat differently as compared with that used in FIG. 1. At any rate, the analog-to-digital converter 29 converts into a digital signal the sensor output signal supplied thereto through the amplifier 23. Controlled by the CCD drive signal like in FIG. 1, the pixel address generator 31 produces a pixel address signal representative of pixel addresses of the pixels in one-to-one correspondence to the digital signal of the pixels. In other respects, the optical sensor arrangement of FIG. 2 is appreciably different in the manner which will become clear as the description proceeds.

Figure 3:
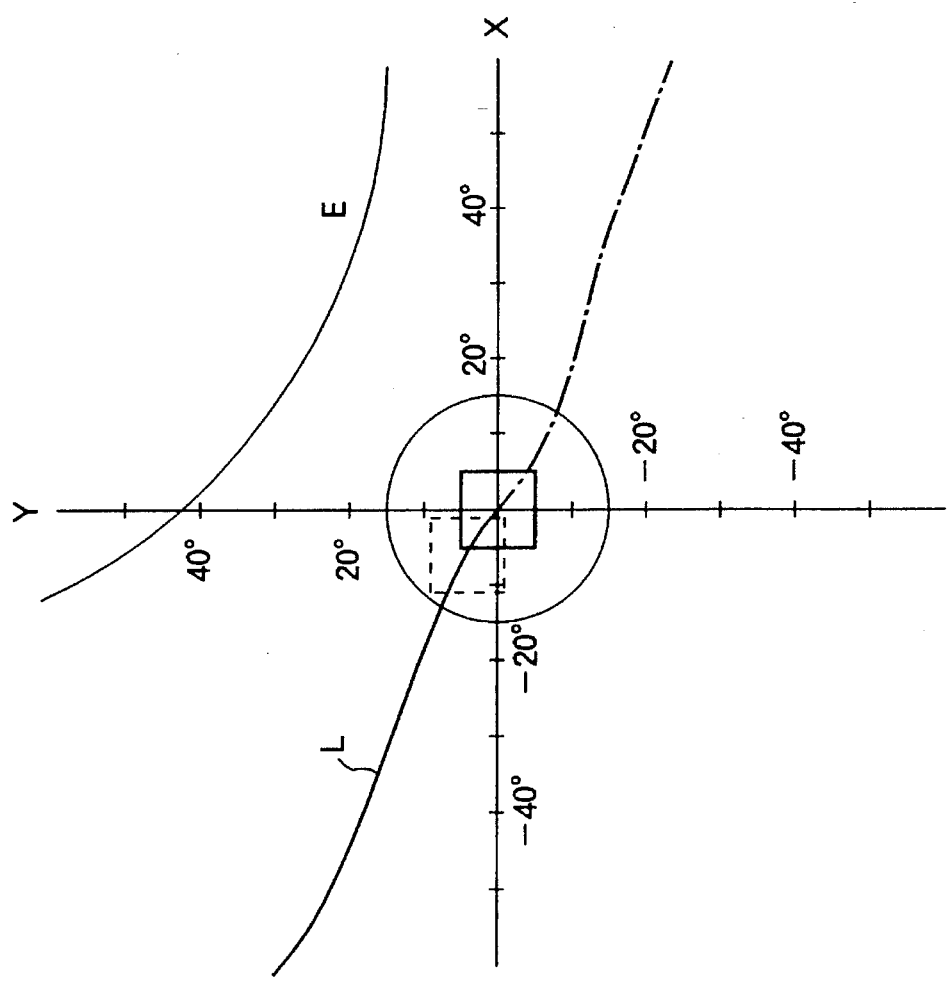
FIG. 3 schematically and partially shows a celestial map.

Turning to FIG. 3 during a short while with FIG. 2 continuously referred to, the optical sensor arrangement is controlled by an attitude control mechanism (not shown) so that the optical axis be controllably directed along a locus exemplified by a curve L in a part of a celestial map viewed from a spacecraft on which the arrangement is mounted. It will be assumed at a current time that the optical system 15 has a visual field depicted by a circle in the celestial map. Up to this time, the locus is illustrated by a solid line. The locus may be scheduled after the current time as depicted by a dash-dot line. The visual field may be restricted by a hood which is attached to the optical sensor arrangement in the manner known in the art and is not depicted. It should be known that the visual field is exempted from a bright celestial body exemplified in the figure as the earth E.

At the current time, the optical sensor 11 receives a real image of a specific part of the visual field that is shown by a solid-line square. One frame period prior to the current time during the data accumulating mode, the specific part is exemplified by a dashed-line square. It is surmised in FIG. 3 that at least one star is present in the specific part in most of the frame period and that the specific part is subjected to only translation although the specific part may be subjected to rotation in addition to the translation. In the optical sensor 11, the pixels are arranged along X and Y axes. The visual field has a visual angle of a radius of about 15 degrees. The visual angle of the specific part has a side of about 10 degrees.

Although known in the art, the attitude control mechanism will briefly be surveyed. The mechanism may control the spacecraft as a whole with the optical sensor arrangement fixedly mounted on the spacecraft. Alternatively, the mechanism may control only the optical sensor arrangement separately of the spacecraft. In either event, it is possible to preliminarily compile a time table for use in making the optical axis of the optical sensor arrangement follow a locus of the type described above in connection with FIG. 3.

Turning back to FIG. 2, a timing signal generator 47 generates a timing signal with reference to the time table. The CCD driver 13 converts the timing signal directly into the CCD drive signal.

A data memory 49 has first, second, third, and other memory addresses 0001, 0002, 0003, and so forth. Such memory addresses are preferably greater in number than the pixel addresses. The data memory 49 is supplied with the digital signal and the pixel address signal and is controlled by the timing signal. It is preliminarily known whether or not many pixels of the optical sensor 11 have white flaws.

Controlled by the timing signal, the data memory 49 is loaded with the digital signal and the pixel address signal in the memory addresses collectively as a memorized signal depending on the number of pixels having the white flaws. In order to describe the memorized signal in greater detail, the digital and the pixel address signals will more particularly be described.

During the frame period of the data accumulating mode of operation, the real image of the above-mentioned at least one star is received in first through N-th instances or incidences of time at different pixels of the optical sensor 11, where N represents a positive integer which is, for example, equal to five. The optical sensor 11 consequently produces first through N-th sensor output signals eventually as the digital signal. It is unnecessary that the real image always represents at least one star throughout the first through the N-th instances of time.

It will be assumed that the specific part of the celestial map is focussed on a square area of the optical sensor 11 in an n-th instance of the first through the N-th instances of time. In the square area, the optical sensor 11 comprises (1, 1)-th through (I, J)-th pixels, where each of I and J represents a positive integer. These pixels will be generally called (i,j)-th pixels, where each of i and j consecutively increases from 1 to I or J, i and j increasing along the X and the Y axes described in conjunction with FIG. 3. In other words, the optical sensor 11 comprises (I×J) pixels of pixel addresses (1, 1) through (I, J). In the n-th instance of time, the pixel addresses will be indicated by (n; i, j). The (i, j)-th pixel produces an (i, j)-th pixel output signal of the n-th instance S(n;, i, j) as the digital signal.

When it is presumed that many pixels, such as all pixels, have the white flaws, the memorized signal is stored in the memory addresses with correspondence established between the pixel addresses (n; i, j) of the memorized signal and the first and the other memory addresses. For example, it will be assumed that each of I and J is equal to three. In this event, the pixel output signal S(1; 1, 1) is stored in the first memory address 0001. The pixel output signal S(1; 2, 1) is stored in the second memory address 0002. The pixel output signal S(1; 3, 1) is stored in the third memory address 0003. The pixel output signal S(1; 1, 2) is stored in the fourth memory address 0004. In this manner, the pixel output signal S(1; 3, 3) is stored in the ninth memory address 0009.

When it is presumed that only a few pixels have white flaws as defective pixels, only the pixel addresses of the defective pixels and the pixel output signals of the defective pixels are successively stored in the first and the other memory addresses. By way of example, it will be assumed that the (1, 1)-th, the (2, 2)-th, and the (2, 3)-th pixels would be defective pixels. In this event, the pixel address (1; 1, 1) is stored in the first memory address 0001. The pixel output signal S(1; 1, 1) is stored in the second memory address 0002. The pixel address (1; 2, 2) is stored in the third memory address 0003. The pixel output signal S(1; 2, 2) is stored in the fourth memory address 0004. The pixel address (1; 2, 3) is stored in the fifth memory address 0005. The pixel output signal S(1; 2, 3) is stored in the sixth memory address 0006.

In the manner which will become clear in the following, a digital processor 51 is controlled by the timing signal to read the memorized signal as a read out signal and to process the read out signal into processed data representative of a dark current compensation signal. Using the processed data, an interface circuit 53 controls the attitude control mechanism.

Figure 4:
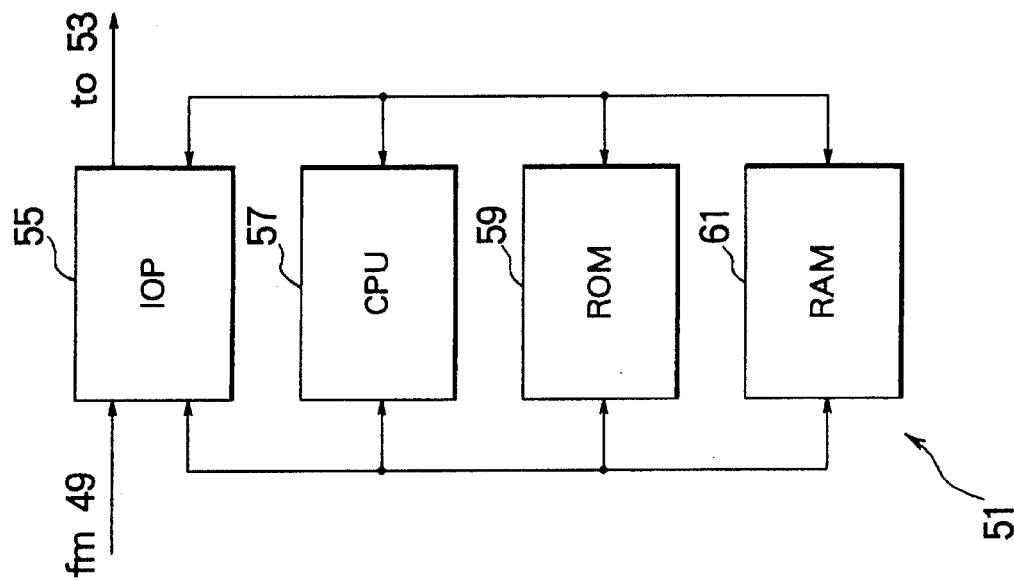
FIG. 4 is a block diagram of a digital processor for use in the device of the optical sensor arrangement depicted in FIG. 2.

Referring afresh to FIG. 4 and continuously to FIG. 2, the data processor 51 comprises an input/output processor (IOP)

55 connected to the data memory 49 and to the interface circuit 53. A central processor unit (CPU) 57, a read-only memory (ROM) 59, and a random access memory (RAM) 61 are connected to the input/output processor 55. The read-only memory 59 is preliminarily loaded with a program for the central processor unit 57.

In compliance with the program, the central processor unit 57 makes the input/output processor 55 read the memorized signal as the read out signal. When the pixel output signals are stored in the data memory 49 with the correspondence established, the read out signal is stored in the random access memory 61 in a direct memory access (DMA) fashion. This is advantageous in achieving a short processing time in storage and read out of the random access memory 61. When the pixel address and the pixel output signals of only the defective pixels are stored in the data memory 49, the central processor unit 57 stores the read out signal in the random access memory 61.

Referring to FIGS. 5 (A) through (F), the (1, 1)-th through the (3, 3)-th pixels are depicted together with levels of the pixel output signals produced in the first through the fifth instances of time n=1, 2, 3, 4, and 5 and a level of an individual dark current obtained by the device being illustrated. The levels are measured on a certain scale. In FIG. 5 (F), the X and the Y axes are indicated by i and j.

In FIG. 5 (A), the pixel output signal S(1; 2, 1) has the level of 5. In FIG. 5 (B), the pixel output signal S(2; 2, 3) has the level of 10. In FIG. 5 (C), the pixel output signal S(3; 2, 1) has the level of 20. In FIG. 5 (D), the pixel output signal S(4; 3, 1) has the level of 6 and the pixel output signal S(4; 2, 3), the level of 5.

In FIGS. 5 (A) through (E), the pixel output signals (1; 2, 2), (2; 2, 2), (3; 2, 2), (4; 2, 2), and (5; 2, 2) have a common level of 3. In FIGS. 5 (A) through (E), other pixel output signals have a common level of zero. In FIG. 5 (F), the device decides as follows that the (2, 2)-th pixel is a defective pixel and produces a dark current of the level 3.

In FIGS. 5 (A) through (D), the real image of the above-mentioned at least one star is focussed substantially on the (1, 2)-th, the (2, 3)-th, the (2, 1)-th, and the (2, 3)-th pixels in the first through the fourth instances of time. In the fourth instance, the real image is focussed also on the (3, 1)-th pixel. In FIG. 5 (E), no star is present in the specific part illustrated in connection with FIG. 3 in the fifth instance. It is now understood that FIGS. 5 (A) through (D) represents projecting means for projecting the real image of at least one star on several elements, such as 3×3 pixels, of the optical sensor elements to make the optical sensor 11 (FIG. 2) produce sensor output signals a few instances of time.

Reviewing FIGS. 2, 4, and 5 (A) through (F), the dark current of each pixel is calculated by the digital processor 51 or by the central processor unit 57 as follows. During the first through the N-th incidences of time, the pixel output signals S(n; i, j) of the (i, j)-th pixel are summed up as a summation into a total (i, j)-th pixel output signal S(T; i, j) without using this pixel output signal in the summation when this pixel output signal results from no reception of the real image by the (i, j)-th pixel. In other words, the (n; i, j)-th pixel output signal S(n; i, j) is omitted from the summation if a difference between this pixel output signal and an ((n-1)); i, j)-th pixel output signal S((n-1); i, j) has an absolute value which is higher than a predetermined level, provided that the last-mentioned pixel output signal is available. The predetermined level may be equal to 2 in view of noise which may be present among the pixels.

Alternatively, the total (i, j)-th pixel output signal is calculated by summing up the pixel output signals S(n; i, j) of the (i, j)-th pixel by using the pixel output signal of a lower level if the difference is higher than the predetermined level. That is:

$$S(T; i, j) = \sum_{n=1}^{N} S(n; i, j),$$

with either none or a lower level of the pixel output signals S(n; i, j) and S((n - 1); i, j) is used in the summation if:

$$|S(n; i, j) - S((n - 1), i, j)| > 2.$$

In the example illustrated in FIGS. 5 (A) through (E), the total (i, j)-th pixel output signal has the level of 15 only for the (2, 2)-th pixel. For other pixels, the total (i, j)-th output signal has a level of zero.

The total dark current results under the circumstances only from the (2, 2)-th pixels. The individual dark current of the (i, j)-th pixel has a dark current level S(A; i, j) which is given by dividing the total (i, j)-th pixel output signal by the number N of the instances of time. That is:

$$S(A; i, j) = S(T; i, j)/N.$$

Besides the above-mentioned projecting means, the device comprises a processor unit (31, 49, 51) for processing the sensor output signal into the processed data representative of the dark current compensating signal, namely, into compensating data for use in compensating for the individual dark currents. In the preferred embodiment of this invention, the device is used in the optical sensor arrangement which comprises the optical sensor (11) comprising, in turn, the optical sensor elements. The processor unit comprises the pixel address generator (13) for generating pixel address signals indicative of pixel addresses of the optical sensor elements. The processor unit comprises the pixel address generator (31) for generating the pixel address signal representative of pixel addresses of the optical sensor elements in one-to-one correspondence to pixel output signals produced by the optical sensor elements, the data memory (49) in which the pixel output signal and the pixel address signal are stored in each incidence of time collectively as a memorized signal, and the digital processor (51) for reading the memorized signal as a read out signal and for digitally processing the read out signal in the incidences of time into the compensating data.

What is claimed is:

1. A device for compensating for dark currents of a plurality of optical sensor elements receiving light of an object star in an optical sensor or an optical sensor arrangement, said device comprising:

projecting means for projecting a real image of at least one star on several elements of said optical sensor to make said optical sensor produce sensor output signals a few incidence of time; and a processor unit for processing said sensor output signals into compensating data for use in compensating for said dark current, said processor unit being effective for compensating for a dark current of the individual output signals of the optical sensor elements on a pixel-by-pixel basis.

2. A device for compensating for dark currents of a plurality of optical sensor elements receiving light of an object star in an optical sensor or an optical sensor arrangement, said device comprising:

projecting means for projecting a real image of at least one star on several elements of said optical sensor to make said optical sensor produce sensor output signals a few incidence of time; and a processor unit for processing said sensor output signals into compensating data for use in compensating for said dark current;

wherein said optical sensor elements produce pixel output signals, and wherein said processor unit comprises:

a pixel address generator for generating a pixel address signal representative of pixel addresses of said optical sensor elements in one-to-one correspondence to the pixel output signals produced by said optical sensor elements;

a data memory in which said pixel output signal and said pixel address signals are memorized in each of said incidence of time collectively as a memorized signal; and a digital processor for reading said memorized signal as a read out signal and for digitally processing said read out signal in said incidence of time into said compensating data.

3. A device as claimed in claim 2, said several elements of the optical sensor elements being (1, 1)-th, (1, 2)-th, (2, 1)-th, ..., and (I, J)-th elements, where (1, 1), (1, 2), (2, 1), ..., and (I, J) are representative of said pixel addresses, where in turn a sum of I and J is equal to the number of said several elements, said incidences of time being first through N-th instances, where N represents the number of said few instances, an (i, j)-th element of said (1, 1)-th through said (I, J)-th elements producing an (n; i, j)-th output signal of a level S(n; i, j) as one of said pixel output signals that is produced in an n-th instance of said first through said N-th instances, wherein said digital processor calculates a total sum of the (1; i, j)-th through (N; i, j)-th output signals without using said (n; i, j)-th output signal when said (n; i, j)-th output signal results from no reception of said real image by said (i, j)-th element, said digital processor further calculating a quotient of said total sum by N as a dark current of said (i, j)-th element for use among said compensating data.

4. A device as claimed in claim 2, said several elements of the optical sensor elements being (1, 1)-th, (1, 2)-th, (2, 1)-th, ..., and (I, J)-th elements, where (1, 1), (1, 2), (2, 1), ..., and (I, J) are representative of said pixel addresses, where in turn a sum of I and J is equal to the number of said several elements, said instances of time being first through N-th instances, where N represents the number of said few instances, an (i, j)-th element of said (1, 1)-th through said (I, J)-th elements producing an (n; i, j)-th output signal of a level S(n; i, j) as one of said pixel output signals that is produced in an n-th instance of said first through said N-th instances, wherein said digital processor calculates a total sum of the (1; i, j)-th through (N; i, j)-th output signals with an ((n-1); i, j)-th output signal used when said (n; i, j)-th output signal results from reception of said real image by said (i, j)-th element provided that said ((n-1); i, j)-th output signal is available, said digital processor further calculating a quotient of said total sum by N as a dark current of said (i, j)-th element for use among said compensating data.

* * * * *